United States Patent [19]

Steffl

[11] Patent Number: 5,287,958
[45] Date of Patent: Feb. 22, 1994

[54] DEVICE FOR STRETCHING AND FIXING SHEET

[75] Inventor: Manfred Steffl, Grassau, Fed. Rep. of Germany

[73] Assignee: Bruckner Maschinenbau Gernot Bruckner GmbH & Co. KG, Siegsdorf, Fed. Rep. of Germany

[21] Appl. No.: 71,358

[22] PCT Filed: Feb. 25, 1991

[86] PCT No.: PCT/EP91/00346
§ 371 Date: Oct. 30, 1991
§ 102(e) Date: Oct. 30, 1991

[87] PCT Pub. No.: WO91/12952
PCT Pub. Date: Sep. 5, 1991

Related U.S. Application Data

[63] Continuation of Ser. No. 773,915, Oct. 30, 1991, abandoned.

[30] Foreign Application Priority Data

Mar. 1, 1990 [DE] Fed. Rep. of Germany ....... 4006440

[51] Int. Cl.$^5$ .............................................. B65G 15/60
[52] U.S. Cl. ..................................... 198/838; 198/845
[58] Field of Search .................. 198/803.7, 803.9, 838, 198/845; 26/51, 72, 89, 93

[56] References Cited

U.S. PATENT DOCUMENTS

| 2,163,693 | 6/1939 | Margles . | |
|---|---|---|---|
| 5,081,750 | 1/1992 | Mölz | 198/838 X |
| 5,101,965 | 4/1992 | Rutz et al. | 198/845 X |

FOREIGN PATENT DOCUMENTS

| 0206317 | 12/1986 | European Pat. Off. . |
|---|---|---|
| 0149878 | 9/1987 | European Pat. Off. . |
| 0291775 | 5/1988 | European Pat. Off. . |
| 558681 | 11/1966 | Fed. Rep. of Germany . |
| 3716603 | 3/1989 | Fed. Rep. of Germany . |
| 1464892 | 1/1967 | France . |
| 2291307 | 6/1976 | France . |

Primary Examiner—D. Glenn Dayoan
Attorney, Agent, or Firm—Nixon & Vanderhye

[57] ABSTRACT

A device for crosswise stretching and fixing of plastic sheeting includes a chain carriage (5) which has an positionally adjustable first roller (7') and a second roller (7) mounted thereon. Tension, resulting from tractive forces transmitted when the chain carriage (5) travels in a running direction, is translated into a prestress force directed substantially in the crosswise direction of a guide rail (11). The prestress force holds the adjustable first roller (7') in constant prestress contact with a first running surface (1") of the guide rail and the second roller (7') in steady contact against a second running surface (1') of the guide rail.

24 Claims, 5 Drawing Sheets

FIG. 9 even without this, an initial prestress can be produced.

DEVICE FOR STRETCHING AND FIXING SHEET

This is a continuation of application Ser. No. 07/773,915, filed Oct. 30, 1991, now abandoned.

FIELD OF THE INVENTION

Device for crosswise stretching and fixing of plastic sheeting

1. Background of the Invention

The invention related to a device for crosswise stretching and fixing of plastic sheeting (according to the introductory clause of claim 1).

2. Related Art

For example, in sheet production the sheeting is fed to a crosswise stretching machine, which exhibits a guide rail arrangement on both sides symmetrical to the sheet longitudinal direction, along which a conveyor chain, filled with clamps, circulates. The conveyor chain generally is driven or is reversed by a forward and reverse sprocket producing a reversal.

The conveyor chain exhibits chain carriages provided with a roller train on which the clamps sit as gripping device for the sheeting. The guide rail generally consists of a section, rectangular in cross section, so that the upper and lower rollers, sitting opposite and aligned with the vertical axis can roll on the thus formed running surfaces.

Basically, also guide rails with running surfaces aligned at an angle to the horizontal and/or vertical are possible and known.

To make possible a frictionless operation, the inside distance between the rollers sitting opposite the two running surfaces of the guide rail is at least slightly greater than the thickness of the guide rail itself. In other words, a play of, for example, 0.3 to 0.5 mm thus results. This play also makes possible an operation in a curve or tolerance deviations on the guide rail itself so that no self-blocking of the chain occurs.

But as a natural consequence of this tolerance measure, especially with increasingly faster driving speeds, vibrations can occur on the conveyor chain, which result not only in a considerable noise stress but also result in an increased wear and adverse effect and limit the maximum possible speeds.

The object of this invention therefore is to provide a device for crosswise stretching and fixing of plastic sheeting which avoids the drawbacks of the prior art and which, especially in comparison with the prior art, makes possible much higher advance and drive speeds for the conveyor chain without disadvantageous consequences.

The object according to the invention is achieved according to the features in claim 1. Advantageous configurations of the invention are indicated in the subclaims.

By the device according to the invention there is the possibility of driving and moving such conveyor chains with very much higher driving speeds along the guide rail in comparison with the prior art without vibrations and the other described disadvantages occurring. According to the invention this is guaranteed by a self-operating prestress device, by which at least one roller running on a running surface of the guide rail is prestressed with a prestress force directed crosswise to it in the direction of the running surface. As a result the tolerance play existing in the prior art can always be reduced to zero, so that because of the floating arrangement of the chain carriage also the running surfaces of the opposite operative rollers always roll resting completely on the running surfaces of the guide rail.

By the invention this prestressing takes place at least partially by a chain lever arrangement, by which an adjustable roller is prestressed. A linked chain lever arrangement is especially favorable, by which also the tractive forces of the chain carriages coupled to one another can be passed along. In addition, by the invention the roller-prestress forces can be simply changed and adjusted differently, for example, also by a selection of different thickness of the guide rail and the related angular adjustment of the chain lever carrying the roller. In other words, the guide rail can be designed even for operation on specific conveying sections with different thickness, by which on these conveying sections at least in relation to the adjustable rollers variably preselectable prestress forces can be set. Finally, by the selection of different thickness of the guide rail also a compensation of the driving forces over the course of the guide rail can be made possible.

As is generally known, the chain prestressing is adjusted by corresponding adjustment of the guide wheel or sprocket. For this purpose, generally at least one sprocket acting as a guide wheel is hydraulically prestressed, by which the corresponding chain prestress forces are generated. By appropriate change of the hydraulic prestress on at least one sprocket and the chain prestress changed by it, according to the invention the prestress forces can then also be adjusted on the rollers of the individual chain carriages, which is especially advantageous. As a result, a control can be purposefully performed. For example, if the drive chain is to be driven with a greater drive force, for example the hydraulic prestress on at least one sprocket can be reduced and thus the chain prestress force in itself is reduced so that, for example, the contact pressure of the rollers on the guide rail always remains constant. But any other change, suitable for the propose, would also be possible, for example, in the sense that with a change to a higher driving speed at the same time also greater chain prestress forces are produced by at least one adjustable sprocket, which then result in increased roller prestress forces on the individual chain carriages.

Finally a desired initial value for the prestress forces can be preset by the kinematics of the attachment of at least one chain lever, of the diameter and arrangement of the adjustable roller itself especially in view of the chain lever configuration especially also with respect to a preselectable guide rail thickness. By the change of the above-explained parameters, the prestress of the chain and thus further in view of the driving forces finally the chain stress can be influenced.

A continuous roller contact on the two opposite running surfaces on the guide rail is thus guaranteed by the floating arrangement of the chain carriages by the at least one adjustable roller each. By this effect because of the existing prestress of at least one adjustable running wheel a striking of the chain is prevented by which also a so-called hammer effect between the rollers and the guide rail can no longer occur.

Other advantages can also be achieved in that, for example, a stop for a maximum deflection is provided on the adjustable rollers themselves.

This stop can be designed, for example, also as a damping or spring element. Even an additional constant spring prestress can be provided on each chain carriage, with which the adjustable roller can be additionally compressively stressed.

The principle according to the invention can be put into effect even in the area of a sprocket if a floating curved guide rail piece freely slidable between the opposite operative rollers is used there. The chain stress on the reversing sprockets is absorbed by the chain bolts, while the rollers bring a guide rail, guided around the sprockets and mounted to float, by their prestressing action in the correct position to the sprocket.

The principle according to the invention can be put into effect not only with a monorail arrangement but also, for example, with a double rail arrangement for the conveyor chain, since here also in each case by at least one adjustable roller according to the invention an immediate distance adaptation to the inside distance between the two guide rails can be made, on which the respective running surfaces for the rollers of the conveyor chain generally lie on the facing sides. What has been said above applies not only for the case of a so-called single chain but also for a so-called double chain.

BRIEF DESCRIPTION OF THE DRAWING

Further advantages, details and features of the invention are seen below from the embodiments represented by drawings. There are shown in particular in.

DETAILED DESCRIPTION OF THE DRAWINGS

Figure 1:
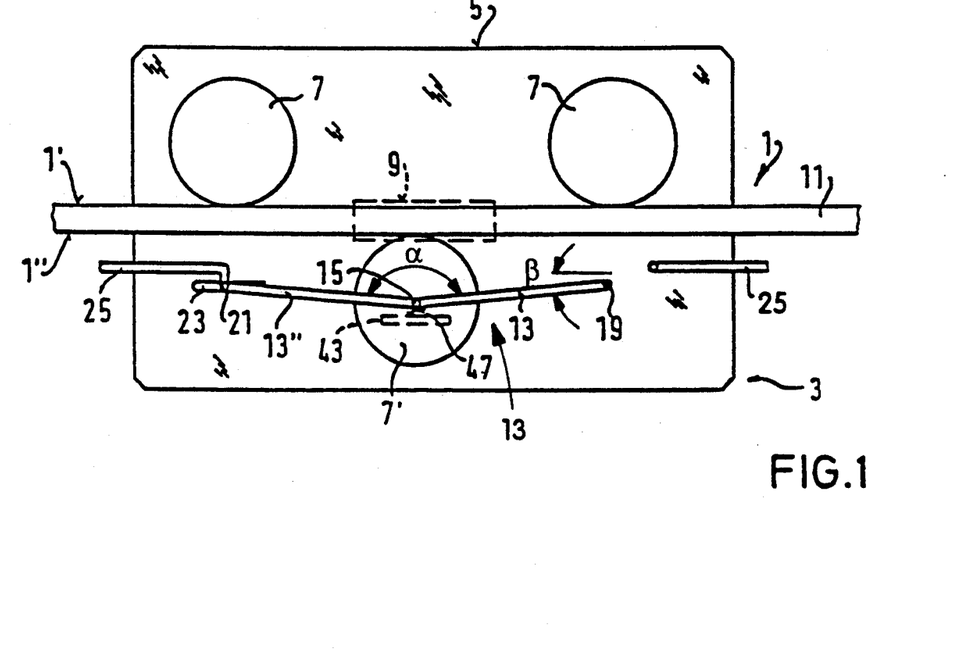
FIG. 1 is a diagrammatic top view of a first embodiment of a chain carriage according to the invention.

FIG. 1 shows (in cutout) a top view of a guide rail 1, along which a conveyor chain can move. In case of a crosswise stretching machine generally the sheeting to be treated is gripped on the right and left of the feed direction of the sheeting by clamps formed on conveyor chain 3. Then the sheetings are fed successively to a preheating zone, a crosswise stretching zone and a fixing zone, before they are again released from the conveyor chains at the delivery point of the machine. In the actual crosswise stretching area, the guide rails spread (crosswise and symmetrically to the feed direction of the sheets) to achieve the crosswise stretching action.

Guide rail 1, represented in FIG. 1 in top view, thus exhibits a rectangular cross section so that first and second running surfaces 1' or 1" are formed.

In the embodiment shown diagrammatically in FIG. 1, two rollers 7 are mounted (torsion-resistant) on chain carriage 5 at a distance from one another and run on outwardly pointing running surface 1' another adjustable roller 7' runs on opposite inside running surface 1" (pointing toward the sheeting in FIG. 1).

As a rule, in each case lower-lying additional rollers 7 or 7' are provided to absorb the tilting moment, but discussion thereof is omitted here.

It is only diagrammatically represented that, besides the rollers 7 and 7' aligned with a vertical axis, for example, at least also one other roller 9 (aligned with a horizontal axis of rotation) can be provided. The roller 9 rolls on an upper horizontally aligned running surface 11 for supporting the bearing weight. The clamps, not shown in detail in drawings, lie on the respective chain carriages, for example, to the sides of adjust rollers 7' but not necessarily.

In the embodiment of FIG. 1 adjustable roller 7' is carried by two chain levers 13', 13" (referred collectively as 13) linked to one another at common hinge pin 15. Pin 15 serves as an axis of rotation for roller 7' aligned vertically, i.e., parallel to running surface 1". For example, the leading chain lever 13' is unslidably rotatably mounted at its point of support 19. Trailing chain lever 13" is mounted to be longitudinally slidable in a longitudinal guide 23. A trailing free end of lever 13" is supported on a point of support 21, by which a force reversing device, explained in detail below, is formed.

An adjacent trailing chain carriage 5 is preferably hinged by a lever 25 at the point of support 21 of trailing chain lever 13". For illustration chain lever 25 is provided with a bend immediately adjacent to point of support 21 so that the drawing chain lever 25, otherwise offset, comes to lie at the longitudinal guide. An adjacent leading chain carriage 5 can be connected by another appropriate lever 25 to a next chain carriage 5, represented in FIG. 1, to transmit the tractive forces initiated by conveyor chain 3. For the sake of completeness, it is noted that leading lever 25, for example, is supported on common point of support 19 with leading lever 13.

With the introduction of the driving forces, e.g., by a sprocket (not shown), conveyor chain 3, represented only in cutout, is moved forward along guide rail 1. The tractive forces are passed on by chain lever 13 to the respective next chain carriage 5. Thus, corresponding to the preset angular position $\alpha$ between the respective two chain levers 13, as rollers 7 and 7' come to lie against running surfaces 1' and 1", prestress forces of insertable roller 7" are produced on related running surface 1", which forces depend only on the angular position $\alpha$ and the tractive forces.

In other words by appropriate selection of the width of guide rail 1, i.e., of the distance separating the running surfaces, an angle-dependent initial value for the prestress of adjustable roller 7' relative to the related running surface 1" can be selected, which value can then be changed as a function of the tractive forces of the conveyor chain.

The explained kinematics is operative independently of the traction direction of conveyor chain 3.

Figure 2:
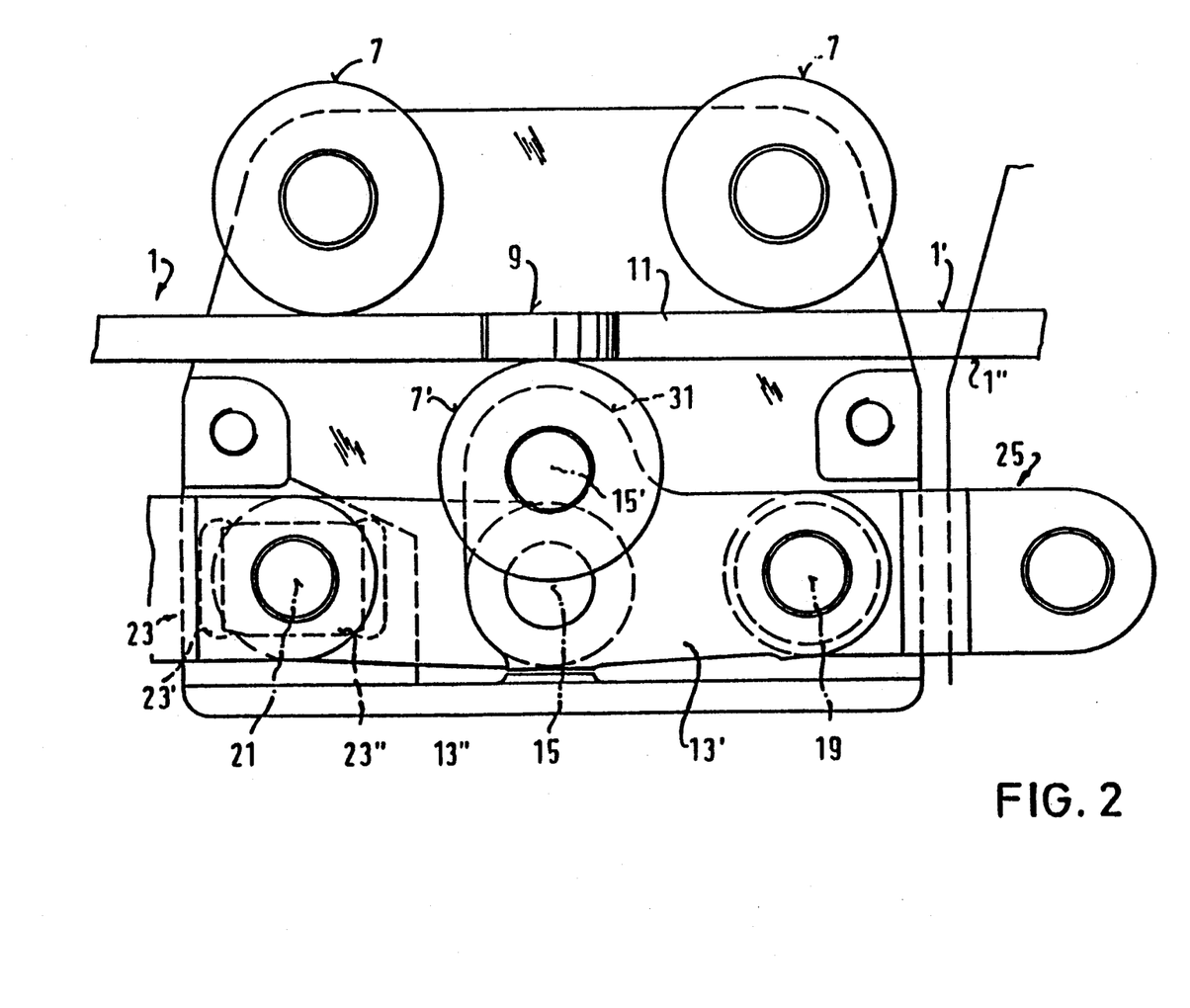
FIG. 2 is a modification of FIG. 1.
Figure 3:
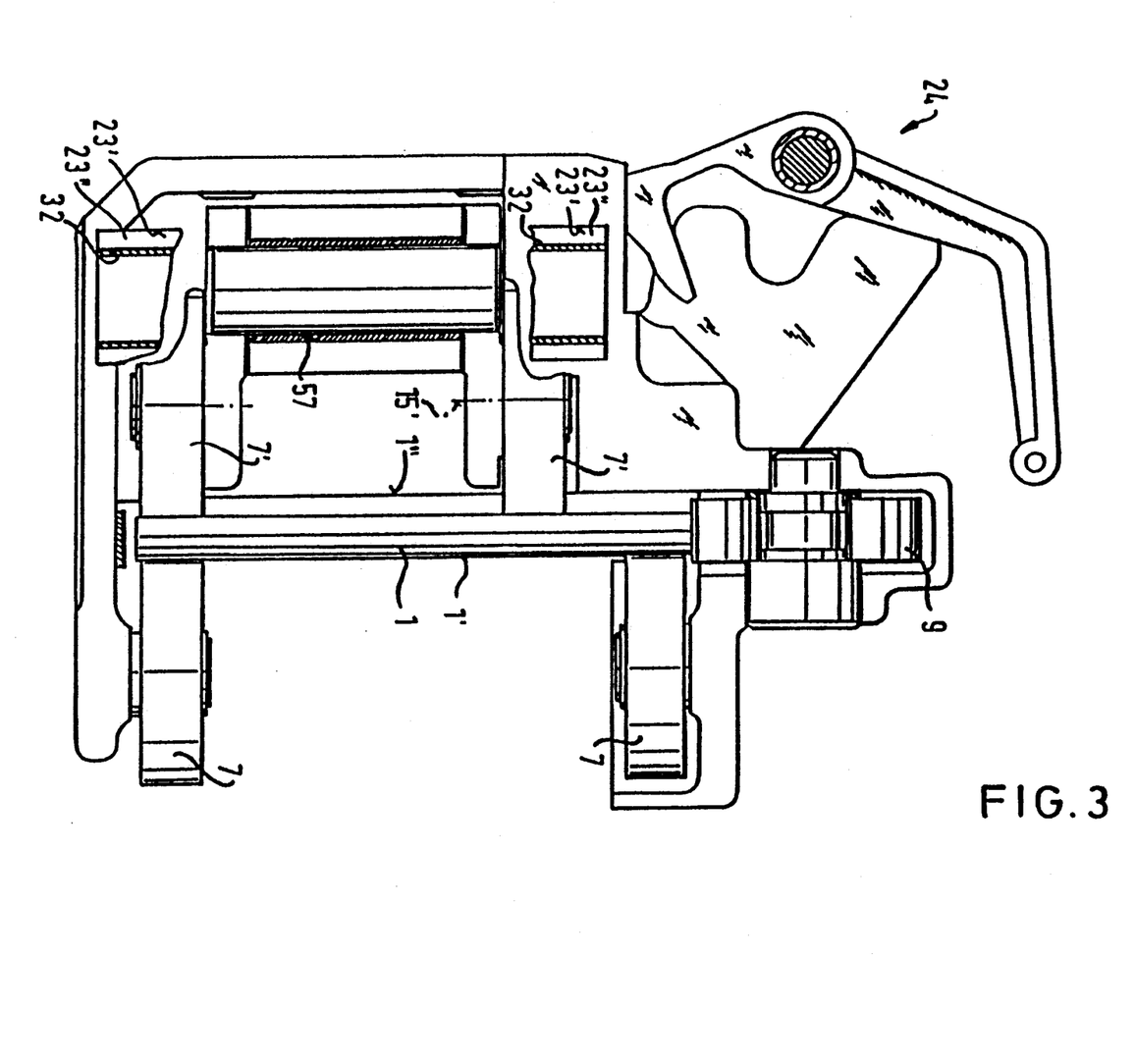
FIG. 3 is a diagrammatic vertical sectional representation through a chain carriage according to the invention.

A detailed embodiment with a clamp 24 is explained by FIG. 2 and FIG. 3.

As shown in FIG. 2 the leading chain lever 13' is supported on its support pin 19, on which another also rotatably supported connection lever 25 is hinged (which, as a chain connection element, produces a connection with the adjacent chain carriage).

A longitudinally slidable carriage 23", on which a pivot pin sits as the point of support 21, is mounted in a longitudinal recess 23' for longitudinal guide 23.

Of course, in practice a corresponding chain lever arrangement will be placed in two superposed planes, just as generally according to FIG. 3 additional rollers 7 and 7' are provided in a plane of a different height for guide rail 1.

Finally, it can also be seen from FIG. 2 that the axis of rotation of adjustable roller 7' does not have to coincide with hinge pin 15. Axis of rotation 15' of adjustable roller 7' is held by an angular projection 31.

Cantilever pin 15 with angular projection 31 and upper and lower roller 7' (mounted to be rotatable about axis of rotation 15') can be seen in the vertical sectional representation crosswise to guide rail 1 according to FIG. 3.

In longitudinal recess 23' the carriage mounted in a bush 32 in carriage 23" can be seen in a sectional plane partially offset to it.

Thus in the embodiment according to FIGS. 1 to 3, the double chain lever arrangement, designed like a bent lever, is stationary relative to chain carriage 5 on, for example, a point of support 19 (formed by a pivot pin) and is movably guided on a second other point of support 21. Support 21 is also a pivot pin, with a degree of freedom in the longitudinal direction parallel to the guide rail (or with a movement component running basically in this direction). Pivot pin 15, made like a hinged joint, is placed to act as a cantilever.

Figure 4:
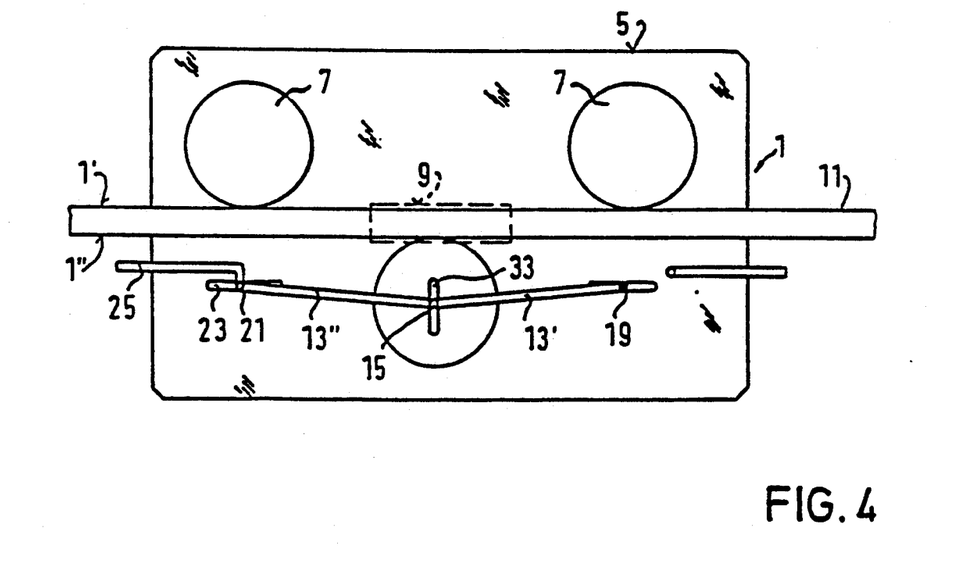
FIG. 4 is a diagrammatic top view of another embodiment of a chain carriage according to the invention.

The embodiment of FIG. 4 is distinguished in that both respective opposite points of support 19 or 21 of bent lever arrangement 13', 13" are mounted to slide and held in a movement direction in the longitudinal direction (or with a movement component basically running this way with a degree of freedom). The hinged joint forming pivot pin 15 is supported to slide only in a direction perpendicular to the guide rail (or with a movement component basically thus aligned). A corresponding pin engaging in a crosswise guide 33 in this case can also be designed separately from pivot pin 15 and also in top view can be offset from it.

Although not shown in detail in the drawings, guide elements other than longitudinal guides 23 or crosswise guides 33 can also be provided, which for guides 33 can also be provided, which, for example, may consist of a guide rod which can be swung around an axis on chain carriage 5. Thus, for example, in FIG. 1 such a guide rod, not shown, in the area of the axis of rotation of roller 7 lying to the left rolling on running surface 1' could be hinged in extension of the related axis of rotation so that the free end of this guide rod forms point of support 19 for trailing chain lever 13'.

Thus in the latter case, for example, point of support 21 can be moved on a circular path with a degree of freedom corresponding to changing angular position α. In view of the insignificance of the absolute shifting of the paths, which are in the tenths of a millimeter range, in this case differences from a genuine linear movement can hardly be established.

The optimal angles between the two chain levers 13' and 13", for example, can be less than 5°, preferably less than 4°, 3° or especially also less than 2°. Even angles of less than 1° are favorable, and even values of at least 0.2°, 0.25° and especially 0.3°, 0.4° and above 0.5° are favorable. As core ranges, angular values between 0.5° and up to 1° or 1.5° have proven especially favorable.

Instead of the above-explained points of support 19 or 21, optionally movable only basically with longitudinal component or only with crosswise component to the guide rail, in certain cases of use guide and adjustment paths at an angle to the roller rail can be provided.

Finally, it is diagrammatically shown in FIG. 1 that on the chain carriage also a stop 43 can be mounted which limits the horizontal swing in a direction opposite to the prestress device for roller 7'. This stop 43 can also be designed as a damping element or spring device, by which even an additional constant prestress force is added to the prestress forces otherwise introduced by the angular position and the tractive forces.

Deviating from the shown embodiments, for example other adjustable rollers 7' can be placed offset in the longitudinal direction of related chain carriage 5. A similar support device can be provided for each of these adjustable rollers 7'. Thus it is also possible that, for example, in FIG. 1 the point of support 19 shown is supported on a carriage of a longitudinal guide of an adjacent adjustable roller on the same chain carriage, so that a linked successive arrangement of two rollers 7', offset to one another, is achieved.

Likewise a mirror-image arrangement would be possible so that point of support 19, as in the example according to FIG. 1, would be permanently anchored to chain carriage 5, around which in each case chain lever 13' of adjustable roller 7, shown in FIG. 1 and of another adjustable roller 7', placed in a mirror image to it, i.e., located to the right in FIG. 1, would also be supported. This second roller 7', not represented in FIG. 1, would then be supported on the right in a longitudinal guide. Of course, in this case separate points of support 19 can also be provided.

Figure 5:
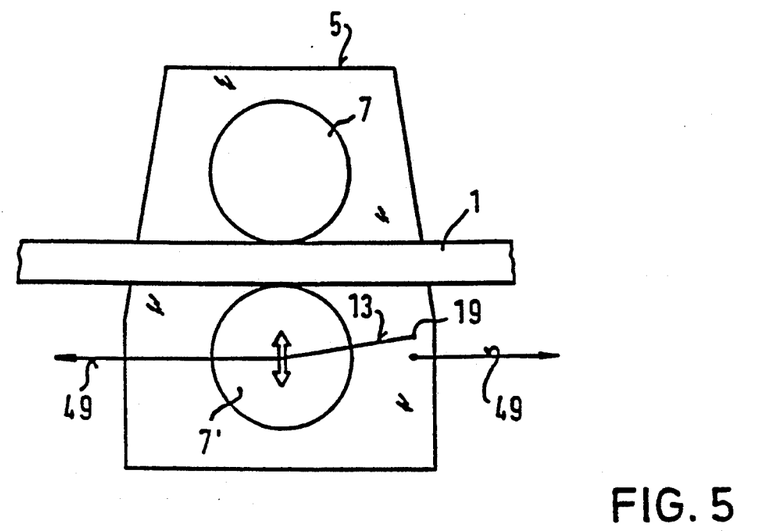
FIG. 5 is a modification of the preceding embodiment in simplified representation with only a chain lever.

In FIG. 5 (in comparison with the preceding embodiments) a simplified variant is shown, which is dealt with below.

One or more unadjustable counterrollers 7 can be provided in chain carriage 5 shown in FIG. 5. Independently therefrom also only one adjustable roller (or two superposed rollers, but which here are understood only in the sense of one roller) is provided. As a force reversing device a single chain lever 13 is provided instead of bent lever. The single chain lever 13, is supported rotatable but not slidable on point of support 19 with respect to the chain carriage and preferably carries on its free end adjustable roller 7' swingable by chain lever 13. Preferably a lever-shaped connection element and traction element 49 is hinged on the free end of the chain lever (or, in any case, at another point of application offset to point of support 19). Element 49 produces the connection with the next chain carriage 5 on which it is also hinged.

Thus, in contrast with the embodiments according to FIGS. 1 to 4, FIG. 5 shows a simplified variant with only a single chain lever 13. The explained embodiment is operative independently of the traction direction of the chain carriage. In any case, acute angle β between chain lever 5 leading away from the roller is selected so that because of the greater distance between related roller 1" and the point of rotation of adjustable roller 7' in comparison with the distance of axis of rotation 19 from related roller 1' prestress forces are always produced in the direction of the running surface.

Figure 6:
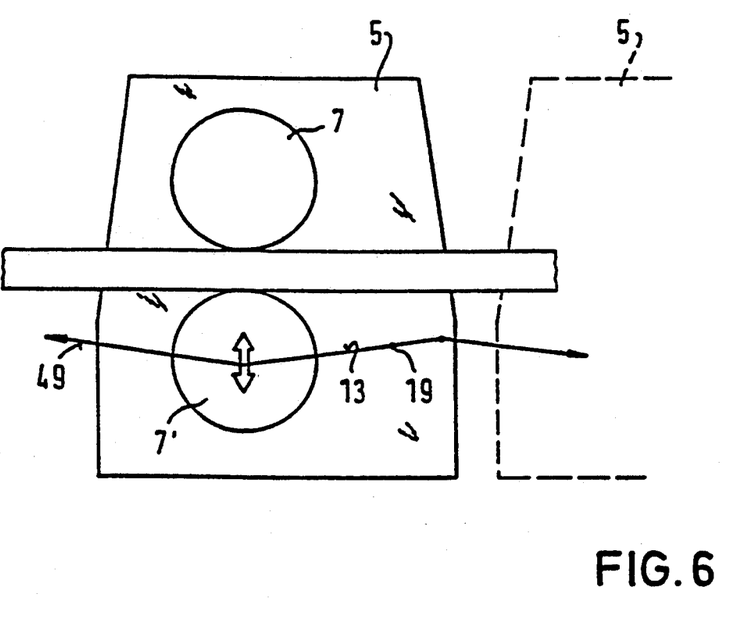
FIG. 6 is another modification of FIG. 5.

FIG. 6 shows diagrammatically a modification to FIG. 5 wherein chain lever 13 can also be extended relative to its axis of rotation and point of support 19, and that the connection to an adjacent chain carriage 5 can be produced by a lever-shaped connection element and traction element 49.

With the tractive forces introduced in this embodiment, in contrast with FIG. 5, by the seesawlike support of the center an equidirectional prestress movement of adjustable roller 7' toward the related running surface takes place.

Figure 7:
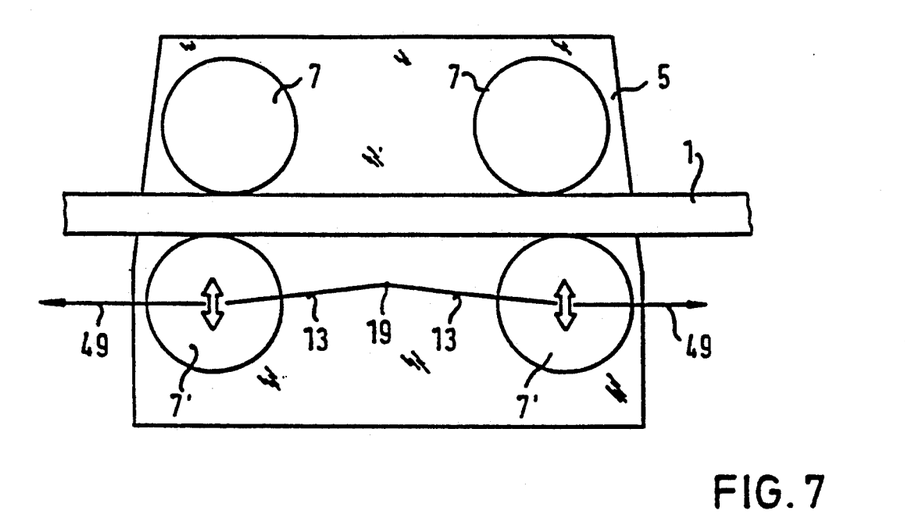
FIG. 7 is another embodiment with two adjustable rollers.

Also in the above-explained embodiments any expansion to several adjustable rollers 7' offset in the longitudinal direction can take place, as also explained diagrammatically by FIG. 7. Common hinge and point of support 19 can also be designed separate, and any number of counterrollers 7 can be selected.

The embodiment according to FIG. 7 proves especially favorable in practice (like the embodiment according to FIGS. 1 to 4). A support (in top view) takes place on at least two (concretely in FIG. 7 on four) points offset to one another on the guide rail device, so that by the chain carriage rotation and tipping forces are optimally absorbed and supported.

The embodiments according to FIGS. 5 to 7, (analogous to the embodiments according to FIGS. 1 to 4) can also be understood and interpreted so that the force reversing device here also consists of a chain lever 13 and a bent lever formed from a lever-shaped connection element and traction element 49, which, for example, is stationary on section axis 49 on related chain carriage 5 and supported rotatably and is also already rotatably supported on the opposite end of the bent lever on next chain carriage 5. The interposed hinged joint with roller 7' is then adjustably movable. Since in this case the one rotatable support of the bent lever takes place on next chain carriage 5, by a slight change of distance between two adjacent chain carriages a longitudinally shiftable support of the end — on the left in FIG. 6 — of bent lever 13, 49 can be achieved, which in this case in principle corresponds to the representation and kinematics reproduced in FIG. 1. Thus in FIG. 1 deviating only on this longitudinally shiftable point of support 21, which is located on the same chain carriage 5, another separate connection lever 25 is hinged on an adjacent chain carriage 5.

Figure 8:
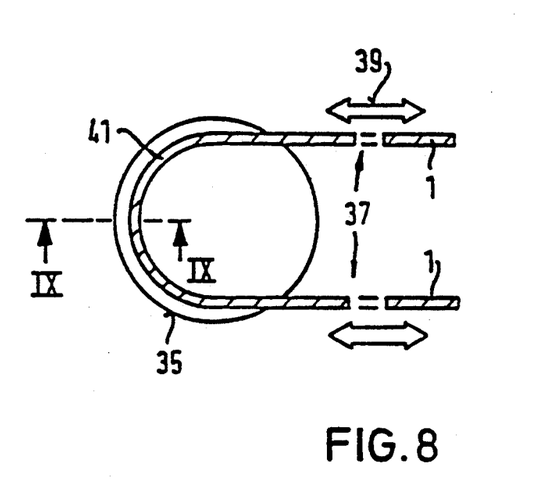
FIG. 8 is a diagrammatic top view of a sprocket with a guide curve as a guide rail mounted to float.
Figure 9:
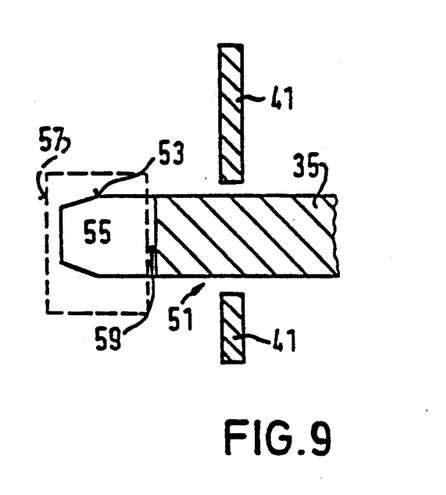
FIG. 9 is a partial vertical sectional representation along line IX—IX in FIG. 8.

The reversal of an above-explained conveyor chain 3 with a sprocket 35 is dealt with in FIGS. 8 and 9.

FIG. 8 shows in diagrammatic top view a sprocket 35 without further representation of the sprocket teeth and tooth spaces. Around sprocket 35 a floating guide curve 41 is represented as a guide rail, a curve which is slidably mounted on its adapter piece 37 according to arrow representation 39. The matching takes place so that the chain carriages can move over these matching points without a problem.

Especially from the vertical sectional representation according to FIG. 9 it can be seen that the curved guide piece exhibits a recess 51 in the central area, through which sprocket 35 projects and especially farthest in the middle area of guide curve 41.

The link pins provided on chain carriage 5 then grip sprocket teeth 53 as well as tooth spaces 55 between two sprocket teeth, pins which are located for example, but not necessarily, as sleeve parts, in the axial extension of stationary point of support 19, represented in FIG. 1, of hinge pin 15 as well as hinge pin and point of support 21 slidable in the longitudinal direction between two outside or inside chain links each and between which are formed recesses, through which sprocket teeth 53 can project. Link pins 57 are shown, for example, in FIG. 3 and 9. To avoid prestress, this link pin 57, held with the adjustable roller on a chain lever 13, also called a tension roller, has clearance 59 at the dedendum of the sprocket, while the other link pins formed on the chain carriage, for example but not necessarily, point of support 19 stationary in the axial extension, as also, for example, point of support 21 guided slidably in a carriage only in the longitudinal direction, can also be in contact at the dedendum with sprocket 35.

By this arrangement the chain stress on the reversing sprockets is absorbed by the link pins, while the rollers of an embodiment curve 41, mounted to float and conducted around the sprockets, bring a designed guide rail by their prestressing action in the correct position to sprocket 37.

I claim:

1. A device for crosswise stretching and fixing of plastic sheeting with a continuous conveyor chain as the device travels in a running direction, the device comprising:
   at least one chain carriage;
   a link for linking the chain carriage to at least one other chain carriage;
   means for supporting the chain carriage with respect to a guide rail, the supporting means comprising:
      at least one first roller adjustably mounted on the chain carriage whereby the position of the first roller is adjustable in a crosswise direction of the guide rail;
      at least one second roller mounted on the chain carriage;
   means for translating tension, resulting from tractive forces transmitted via the link when the chain carriage travels in the running direction, into a prestress force directed substantially in the crosswise direction of the guide rail, which prestress force holds the first roller in constant prestress contact with a first running surface of the guide rail and whereby the second roller is held in steady contact against the second running surface of the guide rail.

2. The device according to claim 1, wherein the tension translating means comprises a chain lever assembly pivotally mounted to the chain carriage, the first roller being at least partially supported by the chain lever assembly.

3. The device according to claim 2, further comprising a stop member on the chain carriage for limiting an extend of pivotal motion of the chain lever assembly.

4. The device according to claim 2, wherein the chain lever assembly is pivotally mounted to the chain carriage at a first point of chain lever assembly support and is further mounted to the chain carriage at a second point of chain lever assembly support, and wherein the prestress force is adjustable by adjusting any one of the following:
   (a) a position of the first point of chain lever assembly support relative to the chain carriage;
   (b) a position of a second point of chain lever assembly support relative to the chain carriage;
   (c) a position of an axis of rotation of the first roller;
   (d) a thickness of the guide rail;
   (e) a position of the guide rail;
   (e) size and/or shape of the chain lever assembly.

5. The device according to claim 2, wherein the chain lever assembly is pivotally mounted to the chain carriage at a first point of chain lever assembly support, wherein the arrangement of the chain lever assembly is preset so that at least a portion of the chain lever assembly is inclined at an acute angle $\beta$ with respect to a plane which includes the first running surface of the guide rail.

6. The device according to claim 5, wherein the angle $\beta$ is in a range between 0.1° and 10°, and preferably is in a range of 0.2° to 0.5°, and is more preferably 0.5°.

7. The device according to claim 1, wherein the chain lever assembly is carried by the chain carriage at a second point of chain lever assembly support, the second point of chain lever assembly support being spaced apart from the first point of chain lever assembly support, the second point of chain lever support being longitudinally slidable with respect to the chain carriage in a direction parallel to the running direction.

8. The device according to claim 7, wherein the first point of chain lever assembly support and the second point of chain lever assembly support are pivot pins anchored in the chain carriage.

9. The device according to claim 7, wherein the chain lever assembly is pivotally mounted by a pivot pin to a carriage at the second point of chain lever assembly support, the carriage in turn being mounted in a longitudinal recess of the chain carriage.

10. The device according to claim 1, wherein the chain lever assembly comprises a first chain lever and a second chain lever, the first and second chain levers being connected together at a lever connection point, the first and second chain levers forming a bend in the chain lever assembly at the lever connection point.

11. The device according to claim 10, wherein a concave interior angle $\alpha$ is formed between the first chain lever and the second chain lever at the lever connection point, and wherein the chain lever assembly is under tensile stress as a result of the tractive forces, whereby the first roller is placed in prestress contact with the first running surface of the guide rail.

12. The device according to claim 11, wherein the concave interior angle $\alpha$ is adjustable.

13. The device according to claim 12, wherein the concave interior angle $\alpha$ is adjustable by adjusting any one of the following:
   (a) the position of the first point of chainlever assembly support relative to the chain carriage;
   (b) the position of a second point of chain lever assembly support relative to the chain carriage.

14. The device according to claim 11, wherein the concave interior angle $\alpha$ being greater than 170° and less than 190°.

15. The device according to claim 10, wherein the first chain lever is mounted to the chain carriage at the first point of chain lever assembly support, and the second chain lever is mounted to the chain carriage at the second point of chain lever assembly support.

16. The device according to claim 10, wherein the chain lever assembly carries, at the lever connection point, a cantilevered hinge pin.

17. The device according to claim 16, wherein the first roller is rotatably mounted on the hinge pin, and wherein an axis of rotation of the first roller coincides with the hinge pin.

18. The device according to claim 16, wherein the first roller is mounted on the chain lever assembly with an axis of rotation of the first roller being offset with respect to the hinge pin of the chain lever assembly.

19. The device according to claim 18, wherein the chain lever assembly has an angular projection formed thereon, and wherein the first roller is supported and held on the angular projection.

20. The device according to claim 19, wherein the axis of rotation of the first roller is closer to the first running surface of the guide rail than to the hinge pin of the chain lever assembly.

21. The device according to claim 1, further comprising biasing means mounted on the chain carriage for biasing the chain lever assembly toward the first running surface of the guide rail.

22. The device according to claim 1, further comprising a second roller adjustably mounted on the chain carriage in constant prestress contact with the first running surface of the guide rail, the second roller adjustably mounted on the chain carriage being spaced apart in the running direction with respect to the first roller.

23. The device according to claim 1, wherein, in an area of a sprocket between the first roller and the second roller, a shiftable guide curve floating on a transition to the guide rail is provided for receiving and transmitting forces to the sprocket.

24. The device according to claim 10, wherein the first chain lever has a first end forming a first point of chain lever assembly support, wherein the second chain lever has a first end forming a second point of the chain lever assembly support, wherein the first end of the first chain lever and the first end of the second chain lever are carried by the chain carriage, wherein the first point of chain lever assembly support and the second point of the chain lever assembly support are slidable in the running direction, and wherein the lever connection point is displaceable in a direction perpendicular to the running direction.

* * * * *